May 8, 1951  J. P. DE GROOT  2,551,998
SUBMERSIBLE DRAG
Filed May 5, 1950

INVENTOR.
JOHN P. DEGROOT
BY
McMorrow, Berman & Davidson
ATTORNEYS

Patented May 8, 1951

2,551,998

UNITED STATES PATENT OFFICE 2,551,998

SUBMERSIBLE DRAG

John Peter De Groot, Peru, Ill.

Application May 5, 1950, Serial No. 160,303

1 Claim. (Cl. 294—66)

This invention relates to submersible drags and more particularly to a drag to be suspended from a boat and moved along the bottom of a body of water to recover bodies or objects lost in the water.

It is among the objects of the invention to provide an improved drag which can be provided in different lengths to quickly cover a large area where the bottom of the body of water is substantially flat or to closely follow the contour of the bottom where the latter has deep holes and narrow channels therein, which includes a buoyant, hook carrying member adjustably positioned above the bottom so that the hooks may be caused to move closely adjacent the bottom but without digging into the bottom in a manner to cause them to become fouled on logs, snags or other obstructions embedded in the bottom of a body of water, which can be reduced to a smooth and compact condition with no exposed hook points or other sharp objects for transportation and storage, which can be quickly assembled and disassembled, and which is strong and durable in construction, of light weight and easy to use, and highly effective in operation.

Other objects and advantages will become apparent from a consideration of the following description and the appended claim in conjunction with the accompanying drawing wherein:

Figure 1:
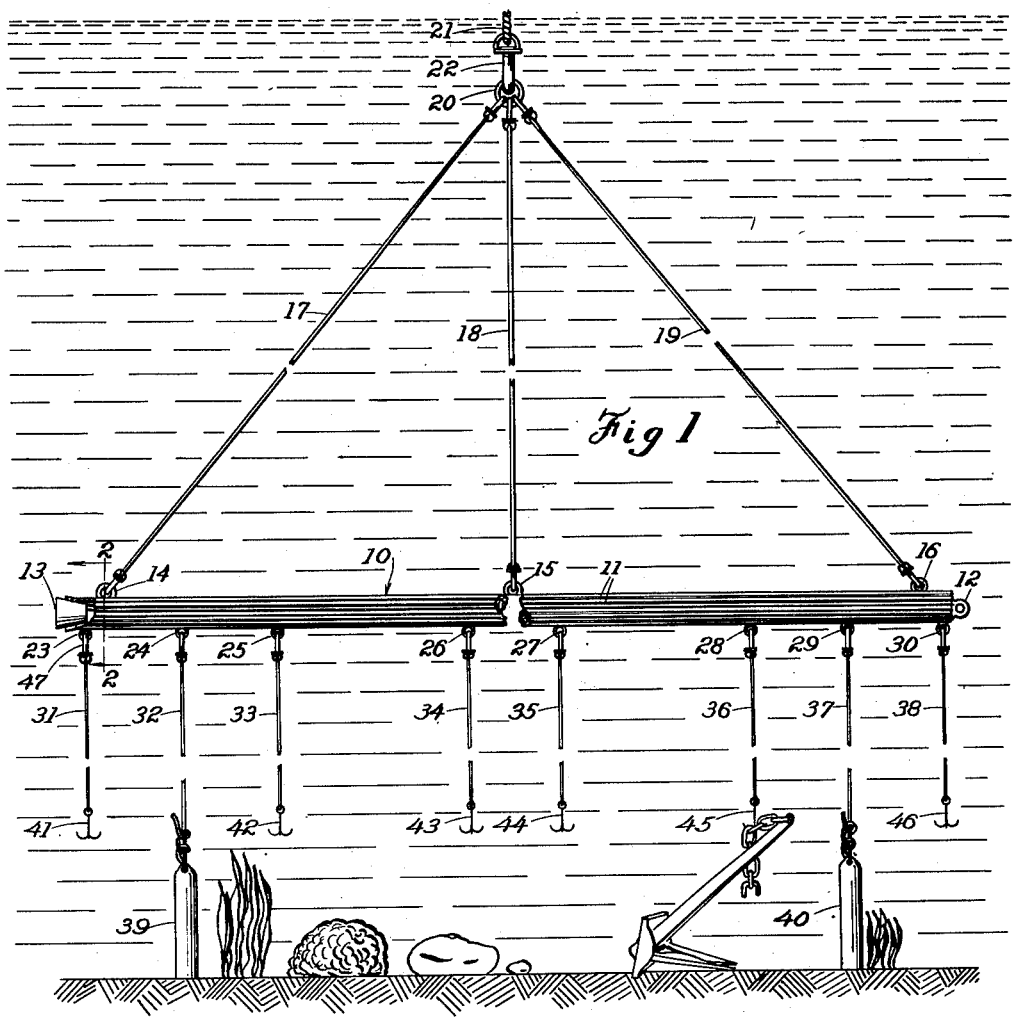
Figure 1 is an elevational view of a submersible drag illustrative of the invention shown operatively positioned in a body of water to recover a body or object from the bottom of the body of water.
Figure 3:
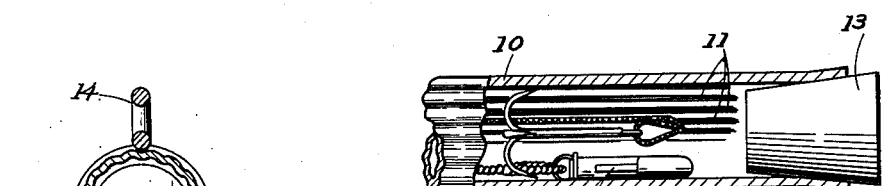
Figure 3 is a fragmentary longitudinal cross sectional view of the device in compacted condition.

With continued reference to the drawing, the body comprises an elongated, thin walled tube 10 preferably formed of a suitable corrosion resisting material such as brass, copper or stainless steel. This tube is longitudinally corrugated, as indicated at 11, to increase its strength and rigidity and is buoyant in water when both of its ends are closed to contain a body of air therein. This tube may be provided in different lengths for different bottom conditions. It is contemplated that where the drag is to be used on a substantially flat bottom the tube may be 10 or 12 feet long so that a large area of the bottom can be quickly covered by the drag and that where the bottom has deep holes and narrow channels therein the tube may be 2 or 3 feet long in order to closely follow the contours of such a bottom.

One end of the tube is permanently closed by a plug having an eye 12 thereon and the other end is closed by a removable plug, such as the rubber stopper 13.

Three line attaching eyes 14, 15 and 16 are secured to the tube at spaced apart locations along one side thereof, the eye 15 being disposed substantially at the mid-length location of the tube and the eyes 14 and 16 being disposed near the respectively opposite ends of the tube. A bridle comprising three lines 17, 18 and 19 are connected each at one end to the eyes 14, 15 and 16 respectively and are connected at their opposite ends to a common ring 20 to which a tow rope 21 may be connected by a swivel hook 22 to suspend the drag from a boat and move the drag along the bottom of a body of water.

A plurality of eyes, as indicated at 23 to 30 inclusive, are secured to the tube 10 at spaced apart locations along the side of the tube opposite the eyes 14, 15 and 16 and a plurality of lines, as indicated at 31 to 38 inclusive, are connected respectively each at one end to a corresponding eye.

The lines 32 and 37 disposed adjacent the respectively opposite ends of the tube 10 are somewhat heavier than the remaining lines and weights 39 and 40 are connected to the lines 32 and 37 respectively at the ends of these lines remote from the tube 10.

Grappling hooks as indicated at 41 to 46 inclusive are secured one to each of the remaining lines at the ends of the corresponding lines remote from the tube 10.

The lines 32 and 37 attaching the weights 39 and 40 to the tube may be adjusted in length to position the grappling hooks relative to the bottom being dragged so that the most effective results can be obtained without having the hooks fouled in obstructions embedded in the bottom.

The tube is of sufficient diameter to receive the hooks, weights, lines and bridle therein so that, by removing the removable plug 13 all of the equipment may be placed inside of the tube and conveniently stored or carried in this condition with no hook points or other sharp elements exposed.

Figure 2:
Figure 2 is a transverse cross sectional view on the line 2—2 of Figure 1.

The bridle and the hook and weight lines are connected to the corresponding eyes by snap hooks, as indicated at 47 in Figure 2, to facilitate the assembly and disassembly of the device and the eye 12 at one end of the tube 10 is of material assistance in handling the drag and may also be used for the attachment of a loose line to the drag so that the drag can be easily recovered if it should break away from the boat by which it is being towed.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A submersible drag comprising an elongated tube, means closing both ends of said tube to render the same buoyant, line attaching eyes secured to said tube at spaced apart locations along opposite sides of the latter, a tow line bridle connected to the eyes at one side of said tube, a plurality of lines connected one to each eye at the other side of the tube, weights connected one to each of two lines disposed adjacent the respectively opposite ends of said tube, and grappling hooks secured one to each of the remaining lines of said plurality of lines, the means closing one end of said tube being removable and said tube having an internal capacity sufficient to receive said bridle, said lines, said weights and said grappling hooks therein.

JOHN PETER DE GROOT.

REFERENCES CITED

The following references are of record in the file of this patent:

UNITED STATES PATENTS

| Number | Name | Date |
|---|---|---|
| 752,550 | Heritage | Feb. 16, 1904 |
| 946,798 | Franz | Jan. 18, 1910 |
| 2,077,630 | Lane | Apr. 20, 1937 |

FOREIGN PATENTS

| Number | Country | Date |
|---|---|---|
| 446,577 | France | Dec. 9, 1912 |
| 801,010 | France | July 25, 1936 |